(12) United States Patent
Albert et al.

(10) Patent No.: US 7,237,025 B1
(45) Date of Patent: Jun. 26, 2007

(54) SYSTEM, DEVICE, AND METHOD FOR COMMUNICATING USER IDENTIFICATION INFORMATION OVER A COMMUNICATIONS NETWORK

(75) Inventors: Mark Albert, Morrisville, NC (US); Robert M. Batz, Raleigh, NC (US); Barron C. Housel, Chapel Hill, NC (US); Wayne R. Roiger, Golden Valley, MN (US); Chris O'Rourke, Apex, NC (US); Richard M. Pruss, San Jose, CA (US); Pranav K. Tiwari, Bangalore (IN); Tzu-Ming Tsang, Chapel Hill, NC (US)

(73) Assignee: Cisco Technology, Inc., San Jose, CA (US)

( * ) Notice: Subject to any disclaimer, the term of this patent is extended or adjusted under 35 U.S.C. 154(b) by 779 days.

(21) Appl. No.: 10/038,982

(22) Filed: Jan. 4, 2002

(51) Int. Cl.
*G06F 15/173* (2006.01)

(52) U.S. Cl. ............ 709/225; 709/227; 709/229; 709/217

(58) Field of Classification Search ............ 709/217, 709/225, 227–229; 379/207
See application file for complete search history.

(56) References Cited

U.S. PATENT DOCUMENTS

| | | | |
|---|---|---|---|
| 5,602,907 A | 2/1997 | Hata et al. .................. 379/114 |
| 5,822,411 A | 10/1998 | Swale et al. ................ 379/111 |
| 5,828,737 A | 10/1998 | Sawyer ....................... 379/114 |
| 5,909,238 A | 6/1999 | Nagashima et al. ........... 348/3 |
| 5,946,670 A | 8/1999 | Motohashi et al. ......... 705/400 |
| 5,987,498 A | 11/1999 | Athing et al. ............... 709/203 |
| 6,016,509 A | 1/2000 | Dedrick ...................... 709/224 |
| 6,035,281 A | 3/2000 | Crosskey et al. ............. 705/14 |
| 6,122,357 A * | 9/2000 | Farris et al. ............. 379/207.02 |
| 6,141,684 A | 10/2000 | McDonald et al. ......... 709/222 |
| 6,167,119 A * | 12/2000 | Bartholomew et al. ... 379/88.04 |
| 6,205,472 B1 * | 3/2001 | Gilmour ..................... 709/206 |
| 6,208,977 B1 | 3/2001 | Hernandez et al. ........... 705/34 |
| 6,282,573 B1 | 8/2001 | Darago et al. .............. 709/229 |
| 6,480,485 B1 | 11/2002 | Kari et al. ................... 370/352 |
| 6,611,821 B2 | 8/2003 | Stahl et al. ................. 705/400 |
| 6,671,675 B2 | 12/2003 | Iwamura ...................... 705/30 |
| 6,690,918 B2 * | 2/2004 | Evans et al. ............... 455/41.2 |
| 6,728,266 B1 | 4/2004 | Sabry et al. ................ 370/468 |

(Continued)

OTHER PUBLICATIONS

Online Inc., "Apogee Releases Content Usage-Based Billing Product Annotated Title—Software allows content usage-based billing," EContent, vol. 24, No. 5, NDN 173-0356-6509-7, 1 pg., Jul. 2001.

(Continued)

*Primary Examiner*—Saleh Najjar
*Assistant Examiner*—Liang-che Wang
(74) *Attorney, Agent, or Firm*—Baker Botts L.L.P.

(57) ABSTRACT

A network includes a service selection gateway that receives information from a network user having a network locator address in order to establish a communications session and an identity of the network user. A client service gateway can receive a request from the network user upon establishment of the communications session. In response to the request, the client service gateway determines if there is an association in a local memory for the network locator address and an identity of the network user, obtains additional information associated with the network user, and processes the request according to the additional information. If an association is not stored in the local memory, the client service gateway sends a query for the identity of the network user to the service selection gateway.

26 Claims, 2 Drawing Sheets

U.S. PATENT DOCUMENTS

| | | | | |
|---|---|---|---|---|
| 6,757,371 | B2 | 6/2004 | Kim et al. | 379/114.22 |
| 6,950,505 | B2* | 9/2005 | Longman et al. | 379/106.02 |
| 2001/0023428 | A1 | 9/2001 | Miyazaki et al. | 709/201 |
| 2002/0029267 | A1* | 3/2002 | Sankuratripati et al. | 709/224 |
| 2002/0138601 | A1 | 9/2002 | Piponius et al. | 709/223 |

OTHER PUBLICATIONS

Centaur Communications, "Secret Bear platform allows paid-for SMS Annotated Title—Secret Bear introduced cross-network reverse billing platform allowing content providers to charge for SMS content," New Media Age, NDN 173-0354-6130-3, 1 pg., Jun. 28, 2001.

Karsten Lüttge, "E-Charging API: Outsource Charging to a Payment Service Provider," NDN 174-0708-0924-8, pp. 216-227, 2001.

A. Herzberg, "Safeguarding Digital Library Contents: Charging for Online Content," D-Lib Magazine, NDN 174-0590-9051-8, 16 pgs., Jan. 1998.

Business Wire, "Apogee Networks Introduces Industry's First Content Usage-Based Billing Solution for Web Hosters," NDN 219-0281-6988-1, 2 pgs., May 8, 2001.

Business Wire, "Apogee Networks Announces Investment by Cisco Systems; Combined Efforts Enhance Billing Capabilities for Content Delivery Network Providers," NDN 219-0220-9035-0, 2 pgs., Jan. 23, 2001.

Business Wire, "Key Analysts Predict Content Billing is the Internet's New Frontier; Content is the Asset of the Industry; Apogee Networks Seen as the Leader in New Internet Industry Space," NDN 219-0162-6934-6, 3 pgs., Oct. 10, 2000.

Business Wire, "Apogee Networks Unveils NetCountant Wireless Billing At SUPERCOMM; Company Demonstrates Industry First Wireless Content Usage Based Billing Solution," NDN 218-0324-8075-6, 2 pgs., Jun. 5, 2001.

Business Wire, "Apogee Networks Wins 2000 Communications ASP Product of the Year Award; Apogee Networks' NetCountant Billing Takes Top Honors for Innovative Content Usage Based Billing Solutions," NDN 218-0282-3757-7, 2 pgs., Mar. 21, 2001.

Business Wire, "Wireless Internet Content Billing and Settlement Capability Announced; Companies Announce Interoperability Between WAP Gateway and Content Billing System," NDN 218-0220-0997-2, 2 pgs., Dec. 6, 2000.

Business Wire, "Apogee Networks Joins Content Alliance; Billing Expert to Join Industry Group Aimed At Advancing Content Networking," NDN 218-0181-2716-7, 3 pgs., Oct. 11, 2000.

Business Wire, "Apogee Networks, Inc. and Paysys International, Inc. to Integrate Technologies to Create Advanced IP Content Billing Solutions," NDN 218-0098-0623-9, 3 pgs., Jun. 19, 2000.

* cited by examiner

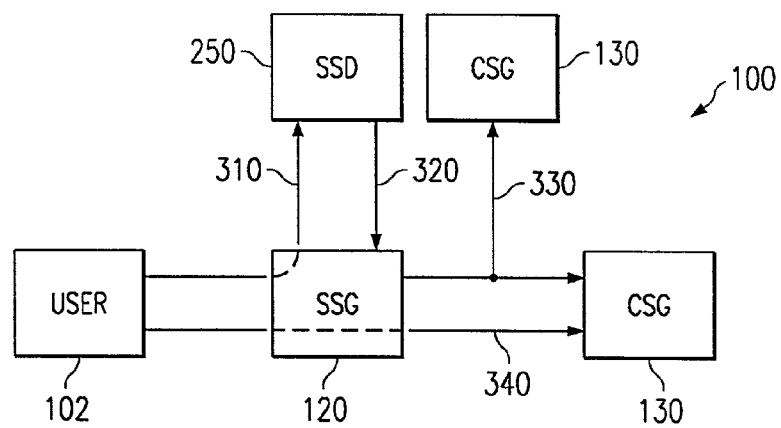
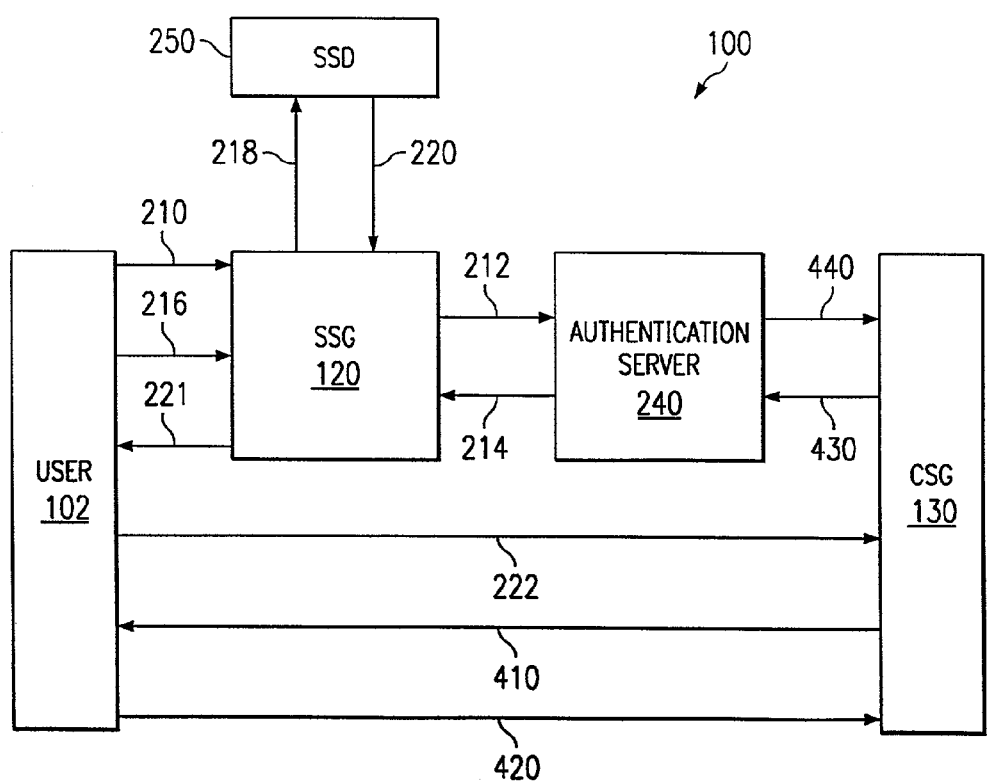

SYSTEM, DEVICE, AND METHOD FOR COMMUNICATING USER IDENTIFICATION INFORMATION OVER A COMMUNICATIONS NETWORK

TECHNICAL FIELD OF THE INVENTION

The present invention relates in general to information transfer over a network and more particularly to a system, device, and method for communicating user identification information over a communications network.

BACKGROUND OF THE INVENTION

Network interfaces known as Service Selection Gateways (SSGs) or Network Access Servers (NASS) terminate Layer 2 protocol connections from network users. Layer 2, or Data Link, information regards the procedures and protocols used to operate communications lines and may include information about network links such as bandwidth, latency, and utilization. The user connections may be of various types, including traditional Point-to-Point Protocol (PPP) over a dial-up connection, Point-to-Point Protocol over Ethernet (PPoE), Point-to-Point Protocol over Asynchronous Transfer Mode (ATM) (PPPoA), Point-to-Point Protocol over Ethernet over Ethernet (PPPoEoE), or other Layer 2 protocols such as GPRS Tunneling Protocol (GTP) that terminate in General Packet Radio Service (GPRS) nodes. In the traditional setting the SSGs handle user authentication and user Internet Protocol (IP) address assignment when a user logs on by using a RADIUS or other Authentication, Authorization, and Accounting (AAA) server. The SSG associates a user-ID with the IP address of that user and retains the user-ID—IP address mapping until the user logs off the network. When the user logs off the network, an "Accounting Stop" message is communicated to the AAA server, and the IP address is returned to an address pool of available addresses.

Network Service Providers (SPs) may locate some client-specific services at the edge of the network in a Point of Presence (POP) location. This enables client-specific services such as data content rating and filtering to be enabled and enforced as closely as possible to the client devices. A network interface, hereinafter referred to as a Client Services Gateway (CSG), exists "upstream" from the NAS within the POP and is operable to provide these types of client services. In order to provide client specific services in a POP, the CSG needs to associate a user-ID with a given client address in order to retrieve the user profile that specifies the services to be applied to a user request. Therefore, it is desirable to have a CSG recognize which incoming packets are associated with a given service.

SUMMARY OF THE INVENTION

From the foregoing, it may be appreciated by those skilled in the art that a need has arisen for a technique to provide client services closer to the location of users in a network. In accordance with the present invention, a system, device, and method for communicating user identification information in a communications network are provided that substantially eliminate or greatly reduce disadvantages and problems associated with conventional information transfer and processing techniques in a network.

According to an embodiment of the present invention, there is provided a system for exchanging user identification information over a communications network that includes a first network interface establishing a communications session with a network user. The network user has a network locator address within the network. A second network interface processes requests from the network user received during the communications session. The second network interface unit determines whether it has stored within its local memory an identity of the network user associated with the network locator address. If the identity of the network user is stored in the local memory for the network locator address, the second network interface obtains additional information associated with the network user. The second network interface then processes the request according to the additional information. If the identity of the network user is not stored in the local memory, the second network interface unit sends a query to the first network interface unit. The first network interface obtains the identity of the network user in response to the query for forwarding to the second network interface. The second network interface stores the identity of the network user in the local memory and associates it with the network locator address of the request. The second network interface can then obtain the additional information associated with the network user and process the request accordingly.

The present invention provides various technical advantages over conventional information transfer and processing techniques in a network. For example, one technical advantage is requiring only a single "sign on" from a network user, thus eliminating multiple challenges to provide a user-ID and password. Another technical advantage is to allow for multiple CSGs in the event that the SSG routes information requests to different CSGs. Yet another technical advantage is to allow "upstream" CSGs to unambiguously determine the user-ID for each network user IP address. Other technical advantages may be readily ascertainable by those skilled in the art from the following figures, description, and claims.

BRIEF DESCRIPTION OF THE DRAWINGS

For a more complete understanding of the present invention and the advantages thereof, reference is now made to the following description taken in conjunction with the accompanying drawings, wherein like reference numerals represent like parts, in which:

FIG. 3 illustrates a simplified scheme of Client Services Gateways (CSGs) in the communications network environment, including data exchanges that will take place during which the user changes Internet Protocol (IP) addresses; and FIG. 4 illustrates a simplified scheme of the Client Services Gateway (CSG) in the communications network environment, including data exchanges that will take place during a typical user login.

DETAILED DESCRIPTION OF THE INVENTION

Figure 1:
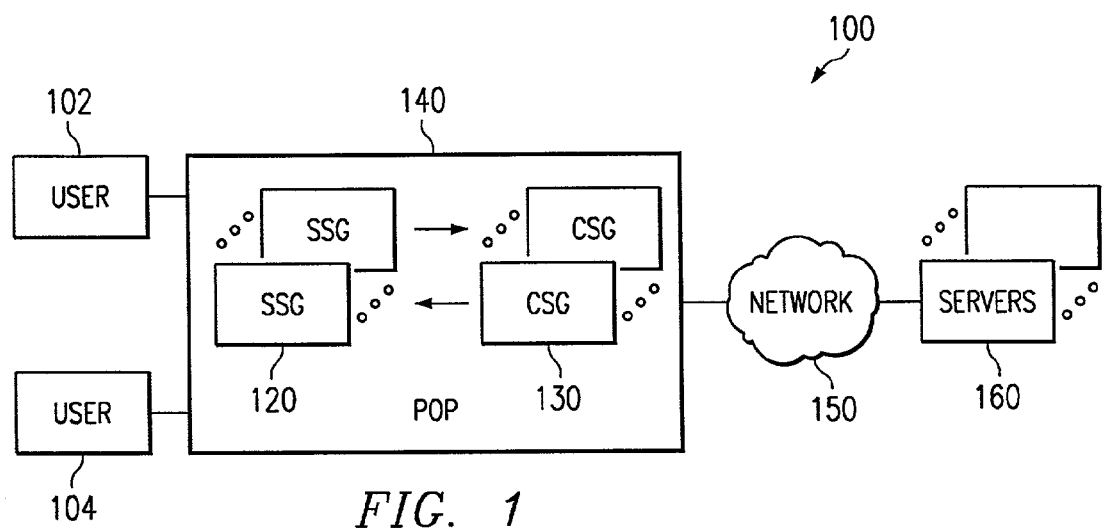
FIG. 1 illustrates a simplified diagram of a communications network environment.

FIG. 1 shows a simplified diagram of a communications network environment 100. Network 100 includes a user 102 connected by a data connection 110 to a Service Provider (SP) at the Point of Presence (POP) 140. Data connection 110 may be a traditional Point-to-Point Protocol (PPP) over a dial-up connection, Point-to-Point Protocol over Ethernet (PPoE), Point-to-Point Protocol over Asynchronous Transfer Mode (ATM) (PPoA), Point-to-Point Protocol over Ethernet over Ethernet (PPPoEoE), or other Layer 2 protocols such as GPRS Tunneling Protocol (GTP) that terminate in General Packet Radio Service (GPRS) nodes. POP 140 may be a physical location where the SP receives data requests from user 102 and network equipment is present and operable to permit user 102 to communicate over network 100. An additional user 104 is also illustrated and is shown connected to POP 140 by data connection 112, which may be of any of the same communication formats as data connection 110.

The SP POP 140 contains a network interface known as a Network Access Server (NAS) 120 and hereinafter referred to as a Service Selection Gateway (SSG) 120. SSG 120 terminates Layer 2 protocol connections from user 102. One task typically performed by SSG 120 is identification of user 102 by verifying the user-ID and password provided by user 102. An additional task performed by SSG 120 is to assign an Internet Protocol (IP) address to user 102 when user 102 seeks to initiate communication on network 100. The SSG 120 is operable to retain user-ID and IP address information in memory until the user 102 terminates the communication.

An SP may move some user-specific services to the edge of the network 100 at POP 140 so that user-specific policies, such as data content rating and filtering, may be enabled and enforced as close as possible to user 102. A second network interface, hereinafter referred to as a Client Service Gateway (CSG) 130, exists "upstream" from the SSG 120 within the POP 140. In a communication network setting, an "upstream" interface is one in which data from a "downstream" interface passes on its way to or from the network 150 and servers 160. CSG 130 has stored in its memory or otherwise has access to a plurality of user-IDs and the services that are to be applied to an individual user-ID. CSG 130 is operable to associate a user-ID with a user IP address so that CSG 130 can retrieve the user profile stored in its memory that specifies the services to be applied as well as recognize which incoming data packets are associated with a request of a specific user 102.

Figure 2:
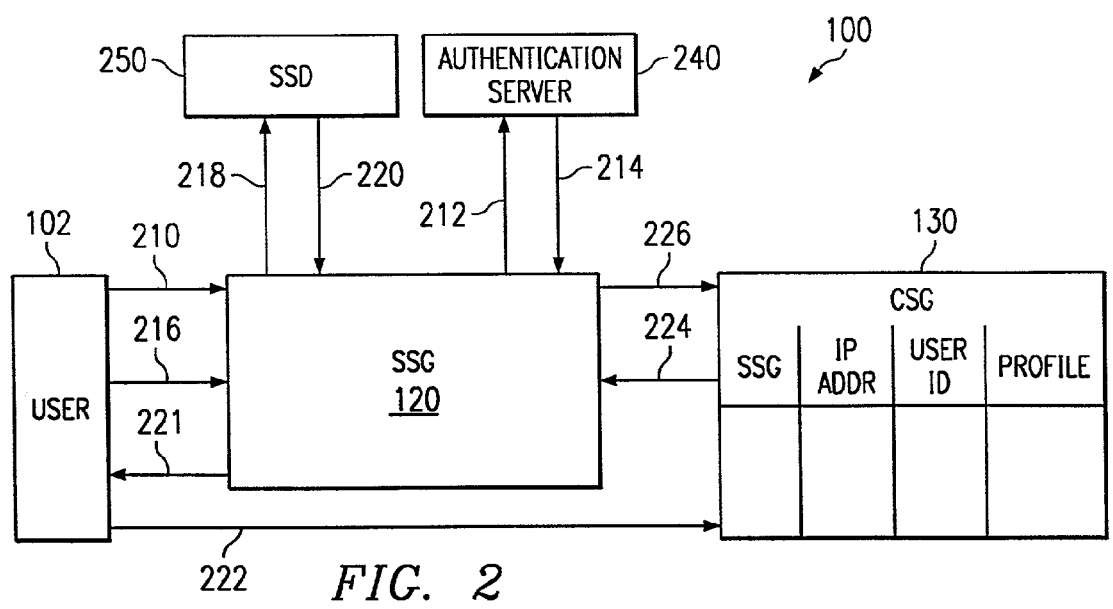
FIG. 2 illustrates a simplified scheme of a Client Services Gateway (CSG) in the communications network environment, including data exchanges that will take place during a typical user login.

FIG. 2 shows a simplified scheme of a CSG 130 in the communications network environment 100 including data communications that will take place during a login by user 102. Preferably a many-to-many relationship exists between the SSGs 120 and CSGs 130, wherein a CSG 130 may receive data traffic from a plurality of SSGs 120 and/or a SSG 120 may route data to a plurality of CSGs 130. Any given data flow, however, arrives at a specific CSG 130 from a specific SSG 120.

An exemplary login sequence by user 102 is initiated by user 102 opening a data session with SSG 120. In a preferred embodiment of the present invention, the data session is a Point-to-Point Protocol (PPP) over a dial-up connection, or other form of communication such as Point-to-Point Protocol over Ethernet (PPoE), Point-to-Point over Asynchronous Transfer Mode (ATM) (PPoA), Point-to-Point Protocol over Ethernet over Ethernet (PPPoEoE), or GPRS Tunneling Protocol (GTP). Upon initiating the data session, user 102 sends a user-ID and password to SSG 120 for authentication as is shown in communication 210. SSG 120 responds to communication 210 from user 102 by querying an authentication server 240 with the user-ID and password of user 102 as is shown in communication 212. In a preferred embodiment of the present invention, authentication server 240 is a RADIUS authentication or other form of Authentication, Authorization, and Accounting (AAA) server 240.

If the user-ID and password match what is stored in the memory of authentication server 240, authentication server 240 communicates that information to SSG 120 as shown in communication 214.

After SSG 120 has authenticated the user-ID and password, user 102 opens a data communication session at communication 216 SSG 120 establishes a link for the session to its portal, Service Selection Dashboard (SSD) 250 at communication 218. The session may be in any data format, but in a preferred embodiment of the present invention, such a data communication session would be a Hypertext Transfer Protocol (HTTP) data session. The SSD 250 is operable to perform this session and serves up a "dashboard" 250, as illustrated at communication 220. Communication 221 illustrates the receipt of this "dashboard" 250 by the user 102, as well as the "dashboard" 250 enabling a "service" with CSG 130 in the path.

Communication 222 illustrates user 102 making a request on this "service," and the request is forwarded by SSG 120 to the CSG 130. As part of communication 222, the IP address of user 102 is provided. When the CSG 130 receives communication 222, it attempts to locate the IP address received from user 102 stored in a mapping table 233 and associated with a user-ID. If the CSG 130 is unable to locate a match of the IP address received from user 102 in memory, the CSG 130 issues a query at communication 224 to the SSG 120 that includes the IP address of user 102. SSG 120 is operable to respond to the query at communication 226 from CSG 130 by returning the user-ID that corresponds to the IP address of user 102. In a preferred embodiment of the present invention, the IP address of each SSG 120 is established along with the range of user IP addresses that can be allocated by that SSG 120. The CSG 130 is thus able to determine the appropriate SSG 120 to query by determining which SSG 120 is allocated the address range that contains the IP address of the unknown user.

Once the CSG 130 determines the appropriate SSG 120 to query, the CSG 130 sends a message to the SSG 120 containing the IP address as is illustrated by communication 224. In a preferred embodiment of the present invention, both the CSG 130 and SSG 120 communicate using the User Datagram Protocol (UDP) format. The SSG 120 responds by sending a message containing the IP address and the associated user-ID to the CSG 130. This is illustrated by communication 226. Upon receiving communication 226, the CSG 130 adds a new entry to a mapping table stored in memory. The mapping table allows CSG 130 to recognize which incoming packets are associated with a given service. In a preferred embodiment of the present invention, the mapping table stores entries in a <source IP address, user-ID> format. CSG 130 is then able to retrieve a user profile associated with the IP address and user-ID in order to apply appropriate services specified therein.

FIG. 3 shows data exchanges that occur when SSG 120 updates all interested CSGs 130. Updates may occur when the IP address of a user changes or an IP address is subsequently assigned to a different user that a user 102 has already been authenticated and queried by the CSG 130 in the above-described manner. It is likewise presumed that both the SSG 120 and CSG 130 have consistent information regarding the IP address and user-ID mapping. Communication 310 illustrates a user 102 opening an HTTP session with the SSD 250. User 102 subsequently logs off that network account and logs on to the network again with another account. SSD 250 notifies the SSG 120 by communication 320 that the user-ID for the data exchange session has changed. The SSG 120 responds by sending out a multicast UDP or other protocol update message to all CSGs 130 with which SSG 120 is communicating as shown by communication 330. The CSGs 130 will update the IP address and user-ID mapping stored in memory with the new IP address of user 102. Communication 340 illustrates the data traffic from user 102 that subsequently passes through the SSG 120 to CSG 130 now has the appropriate user-specific policies from the second account applied to it. Alternatively, SSG 120 may be set to send a message to CSG 130 on a periodic basis or for all new issues being routed to CSG 130 in order to update mapping table 223 without requiring CSG 130 to send a query for an update. CSG 130 ensures that the IP address and user-ID mappings are valid. A mapping may become invalid when user 102 logs off network 100 or a SSG 120 failure occurs. Three techniques are employed to deal with validation of these mappings. First, upon SSG 120 detecting a network logoff event from user 102, SSG 120 issues a multicast message to all CSGs 130 with which the SSG 120 is communicating and communicates the user logoff event. In response, any CSG 130 with a mapping for the now logged-out user IP address removes the entry from its mapping table.

A second technique to ensure mapping validity is to define a minimum "keep alive" time interval for the mapping table entries stored in the memory of CSG 130. CSG 130 will issue a "keep alive" message to SSG 120 if the "keep alive" time interval expires and no other queries have succeeded. The CSG 130 executes the "keep alive" message by re-querying the SSG 120 with the IP address of one of the entries in the mapping table. If the mapping table stored in the memory of CSG 130 is empty (i.e., no users 102, 104 currently active) no "keep alive" message is sent. If CSG 130 does not receive a response from SSG 120 within a set period of time, for example twice the "keep alive" time interval, CSG 130 discards the entire mapping table from memory. In the event that SSG 120 resumes communication with CSG 130, CSG 130 issues queries to re-establish valid mappings. This technique is operable to resolve situations in which user logoff signals from SSG 120 are not properly communicated to CSG 130 due to network congestion or network failure. Similarly, periodic queries may be sent from CSG 130 to SSG 120 in order to validate mapping table 223.

A third technique is employed when SSG 120 ceases to function and then resumes communication. Upon restart SSG 120 communicates a multicast "restart" signal to all CSGs 130 with which SSG 120 is communicating. Each CSG 130 responds to the "restart" signal by voiding the entire mapping table stored in memory and re-querying SSG 120. The mapping tables in CSGs 130 are destroyed and reconstructed upon the failure of SSG 120, because it would be possible for users 102, 104 to logon again, possibly with different IP addresses, following the failure of SSG 120.

FIG. 4 shows an alternative simplified scheme of a Client Services Gateway (CSG) 130 in the communications network environment 100, including data exchanges that will take place during a typical user login. User 102 opens a data communication session with SSG 120 and sends user-ID and password to the SSG 120 for authentication as illustrated by communication 210. In communication 212, SSG 120 queries authentication server 240. Authentication server 240 responds with communication 214, thereby authenticating user 102 and allowing SSG 120 to bring up the user data session. User 102 then seeks to open a HTTP or other protocol communication session with communication 216. The SSG 120 handles this session at communication 218 and serves up a SSD 250 as illustrated by communication 220.

User 102 receives this SSD 250 and enables a "service," which has a CSG 130 in the path. User 102 makes a data request 222 on this "service," which is forwarded by the SSG 120 to CSG 130. CSG 130 attempts to identify a user-ID for user 102 associated with the IP address received as part of the request, but during the first request from user 102 CSG 130 will be unable to do so. Therefore, CSG 130 issues a challenge to user 102 as opposed to the SSG 120 shown in FIG. 2, at communication 410 to prompt user 102 to submit the user-ID and password. User 102 then submits the user-ID and password at communication 420. User 102 has now been required to submit a user-ID and password on two occasions: once when initiating a communication session with the SSG 120 and a second time when initiating a request through the CSG 130. When user 102 responds to the challenge from CSG 130, as illustrated by communication 420, CSG 130 communicates with authentication server 240 at communication 430. Authentication server 240 responds to communication 430 from CSG 130 with communication 440. After user 102 has been authenticated at the request of CSG 130, a data session may proceed.

Thus, it is apparent that there has been provided, in accordance with the present invention, a system, device, and method for communicating user identification information over a communications network that satisfies the advantages set forth above. Although the present invention has been described with respect to network interfaces referred to as Service Selection Gateways (SSGs) and Client Service Gateways (CSGs) the present invention may equally apply to other network interfaces to permit exchanges of such information as user-ID and Internet Protocol (IP) address mappings. Moreover, although discussed in terms of HTTP requests between a user and a CSG, the present invention may be equally implemented in any network that utilizes user identification information. Other examples may be readily ascertainable by those skilled in the art and may be made herein without departing from the spirit and scope of the present invention as defined by the following claims.

What is claimed is:

1. A system for communicating user identification information over a communications network, comprising:

a first network interface operable to establish a communication session with a network user, the first network interface operable to assign the network user a network locator address for the communication session from a range of network locator addresses available to the first network interface for allocation, the first network interface operable to authenticate an identity of the network user;

a second network interface operable to process a request sent by the user in the communication session, the request being forwarded by the first network interface and includes the network locator address of the network user, the second network interface operable to determine if the identity of the network user associated with the network locator address is stored in a local memory of the second network interface, the second network interface operable to obtain additional information about the network user in response to the identity of the network user being stored in the local memory, the second network interface operable to process the request according to the additional information wherein the second network interface is operable to send a query according to the network locator address to the first network interface upon determining that there is no network user identity associated with the network locator address of the network user stored in the local memory, the first network interface operable to provide the identity of the network user to the second network interface in response to the query.

2. The system of claim 1, wherein the second network interface is operable to send a query to the network user upon determining that there is no network user identity associated with the network locator address of the network user stored in the local memory, the second network interface operable to receive the identity of the network user in response to the query.

3. The system of claim 2, wherein the second network interface is operable to authenticate the identity of the network user received from the first network interface.

4. The system of claim 2, wherein the second network interface is operable to store the identity of the network user in the local memory and associate the identity of the network user with the network locator address.

5. The system of claim 1, wherein the network is an Internet Protocol network and the network locator address is an Internet Protocol address.

6. The system of claim 1, wherein the additional information about the network user includes at least one service to be performed on the request.

7. The system of claim 6, wherein the at least one service to be performed on the request includes rating and filtering content of an exchange of information with the network user associated with the request.

8. The system of claim 1, wherein the second network interface associates the request, the network locator address, and the identity of the network user with the first network interface.

9. The system of claim 1, wherein the first network interface provides the second network interface with an association of the identity of the network user with the network locator address upon establishing the communication session.

10. A device for communicating user identification information over a communications network, comprising:
a client service gateway operable to process a request sent by a network user in a communication session, the network user having a network locator address, the request being forwarded by a service selection gateway network interface that has authenticated an identity of the network user and assigned the network locator address to the network user for the communication session from a range of network locator addresses available to the first network interface for allocation, the request including the network locator address of the network user, the client service gateway operable to determine if the identity of the network user associated with the network locator address is stored in a local memory of the client service gateway, the client service gateway operable to obtain additional information about the network user in response to the identity of the network user being stored in the local memory, the client service gateway operable to process the request according to the additional information;
wherein the client service gateway is operable to send a query according to the network locator address upon determining that there is no network user identity associated with the network locator address of the request stored in the local memory, the client service gateway operable to receive the identity of the network user in response to the query, the client service gateway operable to associate and store the received identity of the network user with the network locator address of the request.

11. The device of claim 10, wherein the client service gateway is operable to determine an appropriate one of a plurality of service selection gateways that established the communication session with the network user to send the query in response to the network locator address.

12. The device of claim 10, wherein the client service gateway is operable to receive an association of the identity of the network user with the network locator address upon establishment of the communication session.

13. The device of claim 10, wherein the additional information includes a service associated with the network user to be performed on the request, the client service gateway operable to perform the service on the request.

14. A method for communicating user identification information over a communications network, comprising:
receiving a request by a network user in a communication session, an identity of the network user being previously determined upon establishment of the communication session;
receiving information that identifies a network location of the network user, the network location being assigned to the network user upon establishment of the communication session from a range of network location information available for allocation;
determining if the identity of the network user associated with the network location information is stored in a memory;
retrieving additional information about the network user in response to a determination that the identity of the network user is stored in the memory;
processing the request according to the additional information;
communicating a query according to the network location information for the identity of the network user upon determining that the identity of the network user is not associated with the network location information is stored in memory;
receiving the identity of the network user in response to the query;
storing the received identity of the network user in the memory.

15. The method of claim 14, further comprising:
associating the received identity of the network user with the network location information.

16. The method of claim 14, further comprising:
authenticating an identity of the network user.

17. The method of claim 14, wherein the network is a Internet Protocol network and the network location information of the network user is an Internet Protocol address.

18. The method of claim 14, wherein the additional information includes at least one service to be performed in association with the request.

19. The method of claim 18, wherein the at least one service to be performed includes rating appropriate content of an exchange of information associated with the request.

20. The method of claim 18, wherein the at least one service to be performed includes filtering an exchange of information associated with the request.

21. A system for communicating user identification information over a communications network, comprising:
means for receiving a request by a network user in a communication session, an identity of the network user being previously determined upon establishment of the communication session;
means for receiving information that identifies a network location of the network user, the network location being assigned to the network user upon establishment of the communication session from a range of network location information available for allocation;

means for determining if the identity of the network user associated with the network location information is stored in a memory;

means for retrieving additional information about the network user in response to a determination that the identity of the network user is stored in the memory;

means for processing the request according to the additional information;

means for communicating a query according to the network location information for the identity of the network user upon determining that the identity of the network user is not associated with the network location information is stored in memory;

means for receiving the identity of the network user in response to the query;

means for storing the identity of the network user in the memory.

22. The system of claim 21, further comprising:

means for associating the identity of the network user with the network location information.

23. The system of claim 21, further comprising:

means for authenticating an identity of the network user.

24. The system of claim 21, further comprising:

means for performing at least one service specified by the additional information on the request.

25. A computer readable medium including code for communicating user identification information over a communications network, the code operable to perform a process comprising;

receiving a request by a network user to establish a communication session, the network user having a network locator address within the network;

authenticating an identity of the network user;

assigning the network location to the network user upon establishment of the communication session from a range of network location information available to the first network interface for allocation;

determining if the identity of the network user is associated with the network location information in a memory;

retrieving additional information associated with the network user in response to the memory having an association of the network locator address with the identity of the network user;

processing the request in accordance with the additional information communicating a query according to the network locator address for the identity of the network user upon determining that there is no association in the memory for the network locator address and the identity of the network user;

receiving the identity of the network user in response to the query;

storing the network user identification information in the memory;

associating the identity of the network user in the memory with the network locator address.

26. The computer readable medium of claim 25, wherein the additional information includes a service to be performed on the request, the code operable to perform the service on the request.

* * * * *